2 Sheets--Sheet 1.
J. A. JAQUES, J. T. OAKLEY & L. STERNE.
Magnetic Chucks for Lathes and Planers.
No. 137,875. Patented April 15, 1873.
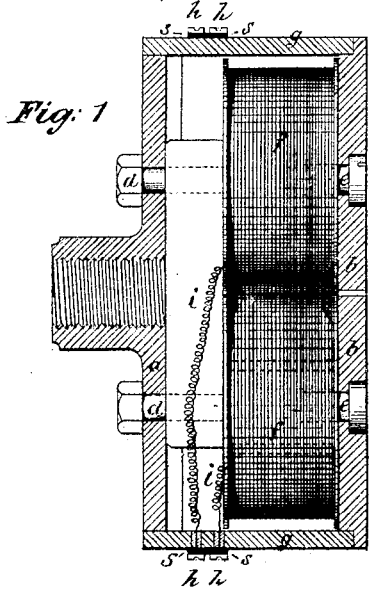
Fig. 1
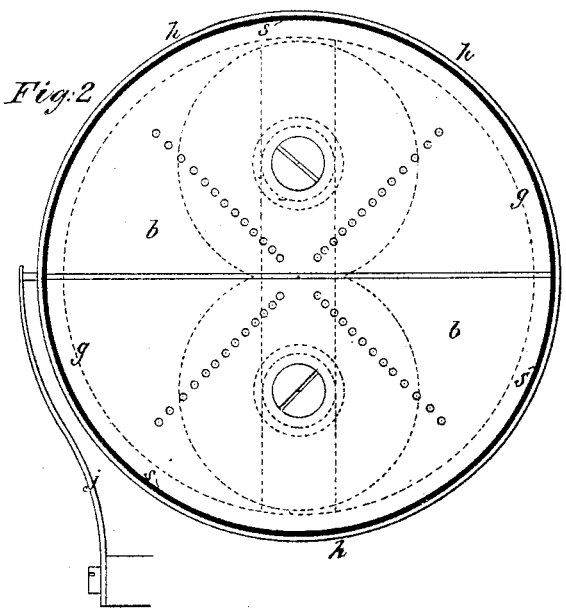
Fig. 2
Fig. 3
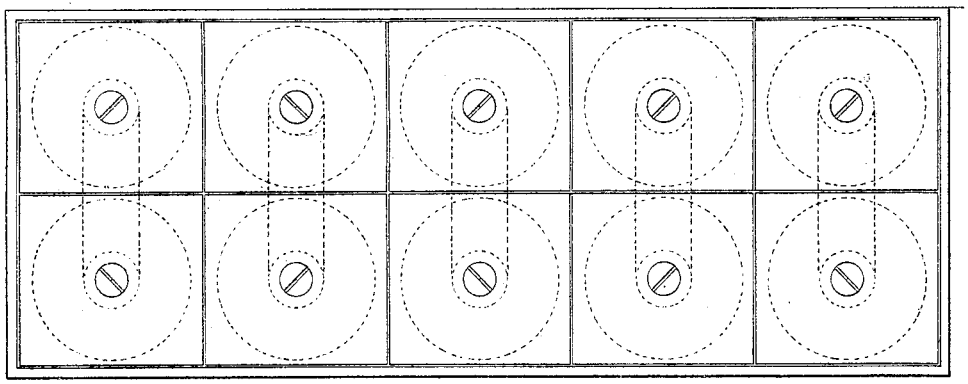
Fig. 4
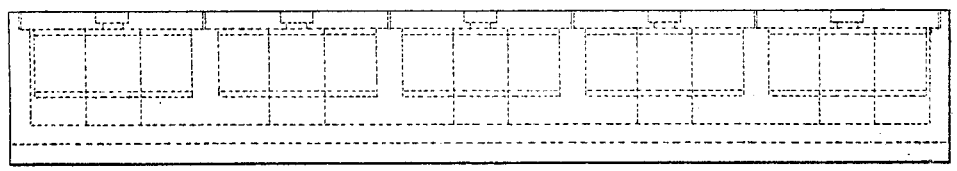
Witnesses:
James A. Jaques
John T. Oakley
L. Sterne
by their attorneys
Brown & Allen

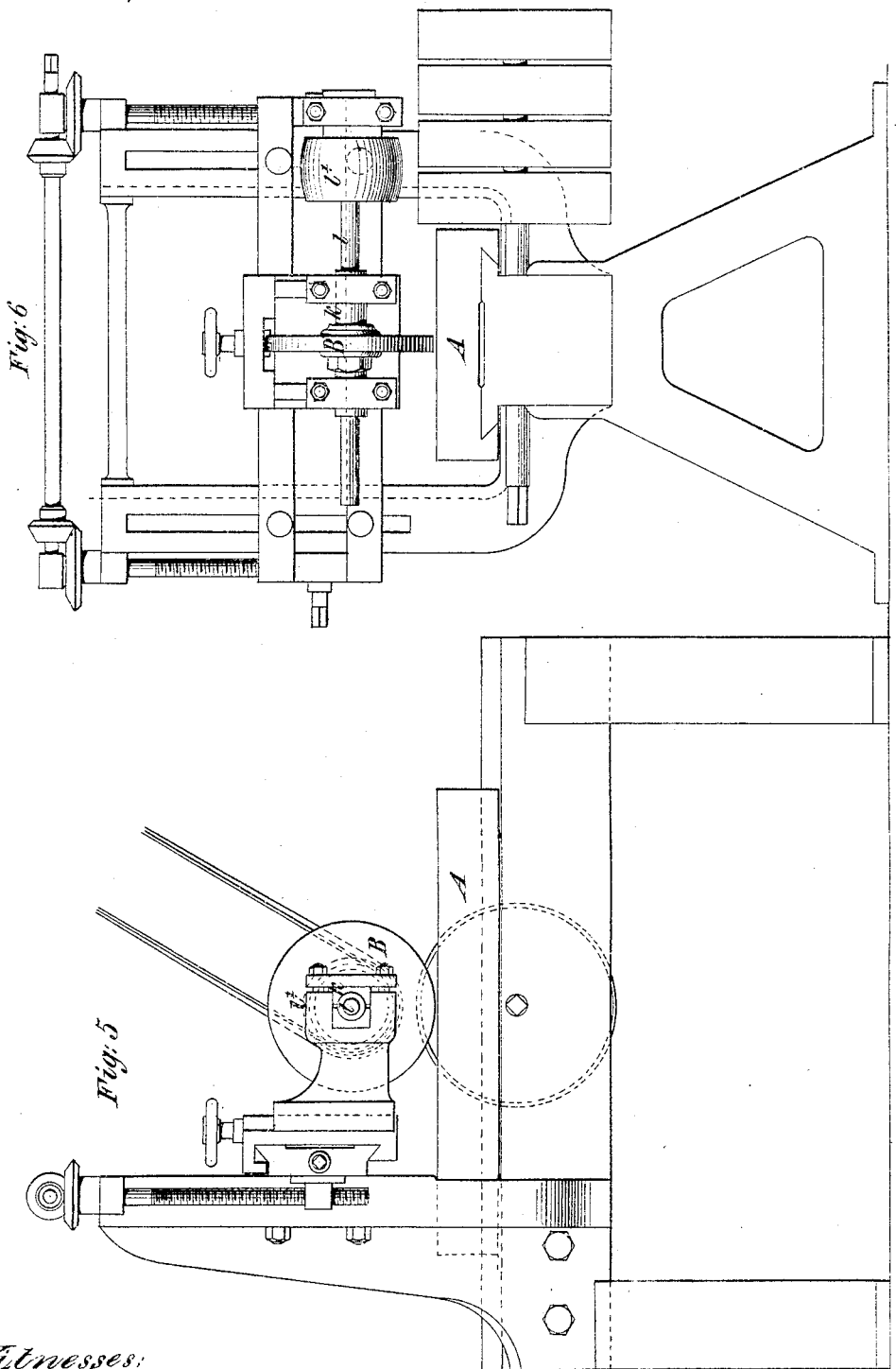

UNITED STATES PATENT OFFICE.

JAMES ARCHIBALD JAQUES, OF TOTTENHAM, JOHN THOMAS OAKLEY, OF GRANGE ROAD, BERMONDSEY, AND LOUIS STERNE, OF WESTMINSTER, ENGLAND.

IMPROVEMENT IN MAGNETIC CHUCKS FOR LATHES AND PLANERS.

Specification forming part of Letters Patent No. 137,875, dated April 15, 1873; application filed December 17, 1872.

*To all whom it may concern:*

Be it known that we, JAMES ARCHIBALD JAQUES, of Tottenham, in the county of Middlesex, chemist, JOHN THOMAS OAKLEY, of Grange Road, Bermondsey, in the county of Surrey, engineer, and LOUIS STERNE, of Victoria Chambers, in the city of Westminster, civil engineer, have invented certain improvements applicable to machinery for grinding, surfacing, drilling, or otherwise working articles made of iron or steel, of which the following is a specification:

Our invention of improvements applicable to machinery for grinding, surfacing, drilling, or otherwise working articles made of iron or steel, relates to a novel form of chuck to be adapted to a lathe for the purpose of holding rings, plates, disks or other analogous articles while they are being ground. The invention is also applicable to planing and drilling machines and other machines in which pieces of iron or steel require to be held while being operated upon. Our present invention consists, first, in constructing the chucks of lathes in an improved manner so as to render them more generally useful. Our invention consists, secondly, in adapting a magnetic holder (constructed on the same principle as the chuck for lathes,) to planing, drilling, and surfacing machines for the purpose of holding the metal article steady while under operation.

In constructing a magnetic chuck for a lathe we form the chuck of two circular disks, one of which is divided across its center into two parts, which are separately connected with the bottom disk by pillars or studs, round which is coiled insulated copper wire, so that by means of a galvanic battery or magneto-electric machine the chuck will be converted into a powerful electro-magnet which, when an article made of iron or steel is placed thereon, will hold it firmly. The invention consists, secondly, in adapting to the bed of a planing or surfacing machine a magnetic holder made of two oblong plates of metal, connected together by pillars or cross-pieces, the upper plate being divided, as in the instance of the chuck, into two parts, which will form the opposite poles of the magnet. Round the connecting plates or pillars are wound coils of insulated copper wire, as in the former instance. For the purpose of strengthening the divided upper plate, the slot or opening between the poles may be filled in with brass, copper, or other non-magnetic substance.

As a modification of the above, the magnet may be formed of one long plate of iron bent up and doubled over, and the two limbs of the magnet may be surrounded with insulated wire, as in the other case. The articles to be operated upon will be firmly held by these magnetic holders on the bed of the planing or other machine, and may be ground or surfaced by emery-wheels or cutting-stones to which a rapid rotary motion, and also a slow lateral motion, is communicated, while the bed or chuck is either rotated (as in a lathe) or reciprocated (as in a planing machine.) The magnetic holder is also applicable to drilling or other machines or mechanical tools in which it is required to hold securely articles made of iron or steel while such articles are being operated upon by the drilling or other tool.

In the accompanying drawing, Figure 1, Sheet 1, is a sectional view; and Fig. 2 a plan of one of the improved chucks, in which $a\ a$ is the back plate of the chuck, the hub of which is screwed or tapped as shown, so that it may be adapted to the lathe in the ordinary manner. $b\ b$ is the face-plate which is divided across into two halves, as shown at Fig. 2. The back and face plates may be connected together by two pillars, as already mentioned, or by means of a bent bar of soft iron, $c$, (as shown at Fig. 1,) which is secured to the back plate $a$ by means of screws $d\ d$. The coils of insulated copper wire are placed on the two poles or bent up parts of the iron bar $c$, and then the face-plate is put on and screwed in place by means of the screws $e\ e$, or, if preferred, it may be riveted thereto. The magnet thus formed is inclosed in a circular casing, $g\ g$, round which are placed the two brass rings $h\ h$, which are insulated upon the casing $g$ by means of a ring, S, of vulcanite or hard India-rubber compound, or other suitable material. The terminal wires $i\ i$ from the two poles of the magnet, pass through the circular casing $g$ and are connected to the brass rings $h\ h$ which have a groove formed in them to receive the points of the studs or pins projecting from the insulated springs $j\ j$, which are fixed on some convenient part of the lathe. Wires from these springs $j$ are connected to the two poles of a galvanic battery, and when the electric current is allowed to pass therefrom and circulate through the coils of wire $f\ f$, the apparatus will be converted into a powerful electro-magnet, of which the two semicircular halves of the face-plate $b$ will form the poles. It will therefore be understood that if any article of iron or steel be placed on the face-plate of the magnetic chuck it will be held with great force until the electro-current is broken. While the iron or steel article is thus held on the face of the chuck, it may be operated upon either by grinding-wheels or cutting-tools. In order to assist in centering and holding the article on the face of the chuck, a number of holes are drilled in the face-plate $b$ into which pins or studs may be driven or screwed.

A magnetic bed constructed in a similar manner may be adapted to a drilling, shaping, slotting, or other machine of analogous character, but when such bed is stationary the brass rings $h\ h$ are dispensed with, care being always taken that the terminal wires $i\ i$ are insulated at the points where they pass through the circular casing. Any number of these electro-magnetic face-plates may be combined, if desired, so as to form an extended surface, such as that shown at Figs. 3 and 4, and large enough to receive large pieces of work. A magnetic bed-plate, such as that above described, may be adapted to an ordinary planing-machine provided with ordinary cutting-tools; but for many purposes, especially where rapidity of work is required, we employ grinding-wheels for surfacing the metal, as already mentioned in reference to the lathe.

Fig. 5 is a side elevation, and Fig. 6 an end elevation, of a planing-machine constructed in this manner. A is the magnetic bed-plate, and B the grinding-wheel, which is mounted on a sleeve-shaft, $k$, in bearings carried by the ordinary adjustable tool-holder. Through the sleeve shaft $k$ passes the feathered shaft $l$ on which is mounted the band-wheel $l'$ whereby it is driven, by means of a band or strap, from the driving-pulley over head. The magnetic bed, with the iron or steel article thereon, is reciprocated in the manner usually adopted in ordinary planing-machines. The same observation applies to traversing the grinding-wheel across the face of the work.

Having now described our invention of improvements applicable to machinery for grinding, surfacing, drilling or otherwise working articles made of iron or steel, and having explained the manner of carrying the same into effect, we claim as our invention—

1. Constructing magnetic chucks for lathes in the manner herein set forth.

2. Constructing the beds or tables of planing, drilling, slotting and surfacing machines as herein set forth, and adapting thereto electro-magnets, so that articles of iron or steel placed thereon to be operated upon may be securely held while under operation, as above described.

JAS. A. JAQUES.
JOHN T. OAKLEY.
L. STERNE.

Witnesses:
  H. K. WHITE,
    66 *Chancery Lane*,
  J. W. WYNN,
    24 *Royal Exchange, London.*